United States Patent
Woller, Sr.

(10) Patent No.: US 7,310,906 B1
(45) Date of Patent: Dec. 25, 2007

(54) ADJUSTABLE RATTLE FISHING LURE

(75) Inventor: John Woller, Sr., Decatur, AL (US)

(73) Assignee: EBSCO Industries, Inc., Birmingham, AL (US)

( * ) Notice: Subject to any disclaimer, the term of this patent is extended or adjusted under 35 U.S.C. 154(b) by 0 days.

(21) Appl. No.: 11/422,780

(22) Filed: Jun. 7, 2006

(51) Int. Cl.
*A01K 83/06* (2006.01)

(52) U.S. Cl. .................... 43/42.31; 43/42.22

(58) Field of Classification Search ........... 43/42.31, 43/42.22, 43.14; *A01K 85/00*
See application file for complete search history.

(56) References Cited

U.S. PATENT DOCUMENTS

| | | | |
|---|---|---|---|
| 2,488,678 A | 11/1949 | Nardi | |
| 2,738,610 A * | 3/1956 | Everett | 43/26.2 |
| 2,909,863 A | 10/1959 | Rector et al. | |
| 3,071,884 A | 1/1963 | Peltz | |
| 3,449,852 A | 6/1969 | Mitchell | |
| 3,877,168 A | 4/1975 | Stevens | |
| 3,894,350 A | 7/1975 | Parker | |
| 3,905,147 A | 9/1975 | Snipes | |
| 3,935,660 A | 2/1976 | Plew | |
| 4,203,246 A | 5/1980 | Sacharnoski, Sr. | |
| 4,453,335 A * | 6/1984 | Smith | 43/42.31 |
| 4,745,700 A | 5/1988 | Davis | |
| 4,803,793 A * | 2/1989 | Schellenberg, III | 43/42.33 |
| 4,930,247 A | 6/1990 | Dubois | |
| 4,969,287 A | 11/1990 | Johnson | |
| 4,995,189 A | 2/1991 | Crihfield | |
| 5,024,019 A | 6/1991 | Rust et al. | |
| 5,134,799 A * | 8/1992 | Trnka | 43/42.22 |
| 5,144,765 A | 9/1992 | Keeton | |
| 5,259,151 A | 11/1993 | Wicht | |
| 5,381,622 A | 1/1995 | Tregre | |
| 2001/0047609 A1 | 12/2001 | Orgeron | |
| 2002/0014031 A1 | 2/2002 | Brinkman | |
| 2002/0032977 A1 | 3/2002 | Wacha | |
| 2003/0093939 A1 * | 5/2003 | Salonen et al. | 43/42.22 |
| 2005/0072038 A1 | 4/2005 | Daley | |
| 2005/0223620 A1 | 10/2005 | Pixton | |

FOREIGN PATENT DOCUMENTS

| | | |
|---|---|---|
| WO | WO 9014761 A1 * | 12/1990 |
| WO | WO-2000/22922 | 4/2000 |
| WO | WO-2002/094017 | 5/2002 |
| WO | WO-2004/019677 | 3/2004 |

OTHER PUBLICATIONS

Advertisement for "Rattlin' Rapala"; www.rapala.com.
Advertisement for "Cabela'a RealImage Plus Jointed Rad Shad"; www.cabelas.com.
Advertisement for "Cabela's Fisherman Series Mini-Dig-It"; www.cabelas.com.

* cited by examiner

*Primary Examiner*—Teri Pham Luu
*Assistant Examiner*—Joshua Michener
(74) *Attorney, Agent, or Firm*—Smith Gambrell & Russell LLP

(57) ABSTRACT

A fishing lure having a rattling assembly for attracting fish, wherein the sound of the rattling assembly is adjustable. The rattling assembly includes a rattle member and a rod member positioned inside a cavity defined in the body of the fishing lure. The rod member traverses the exterior surface of the fishing lure into the cavity, such that the position of the rod member will determine the ability of the rattling member to travel within the cavity to strike the walls of the cavity.

2 Claims, 1 Drawing Sheet

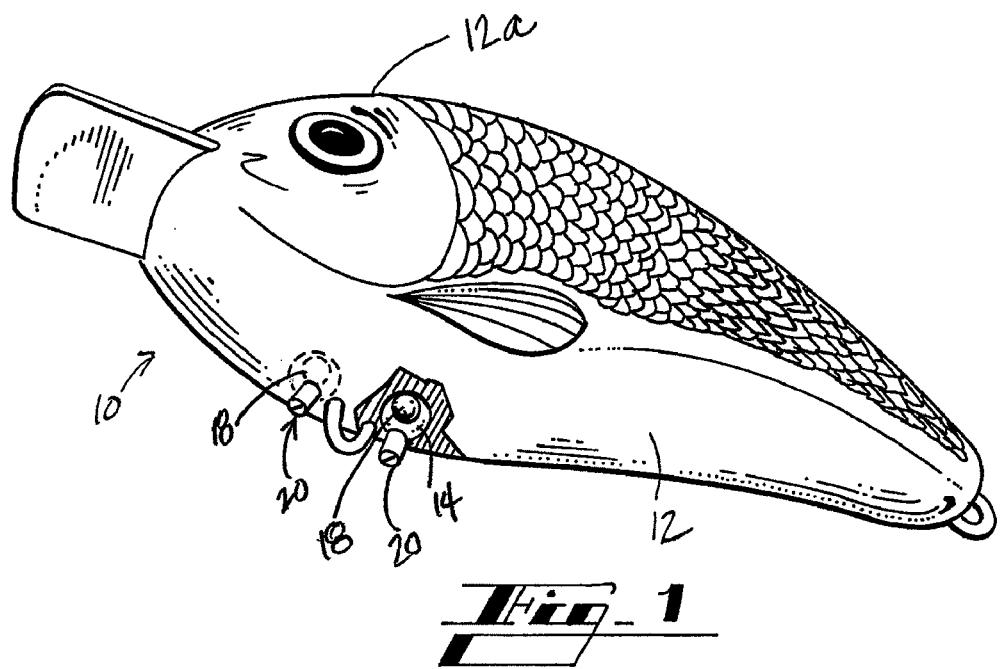
Fig_1
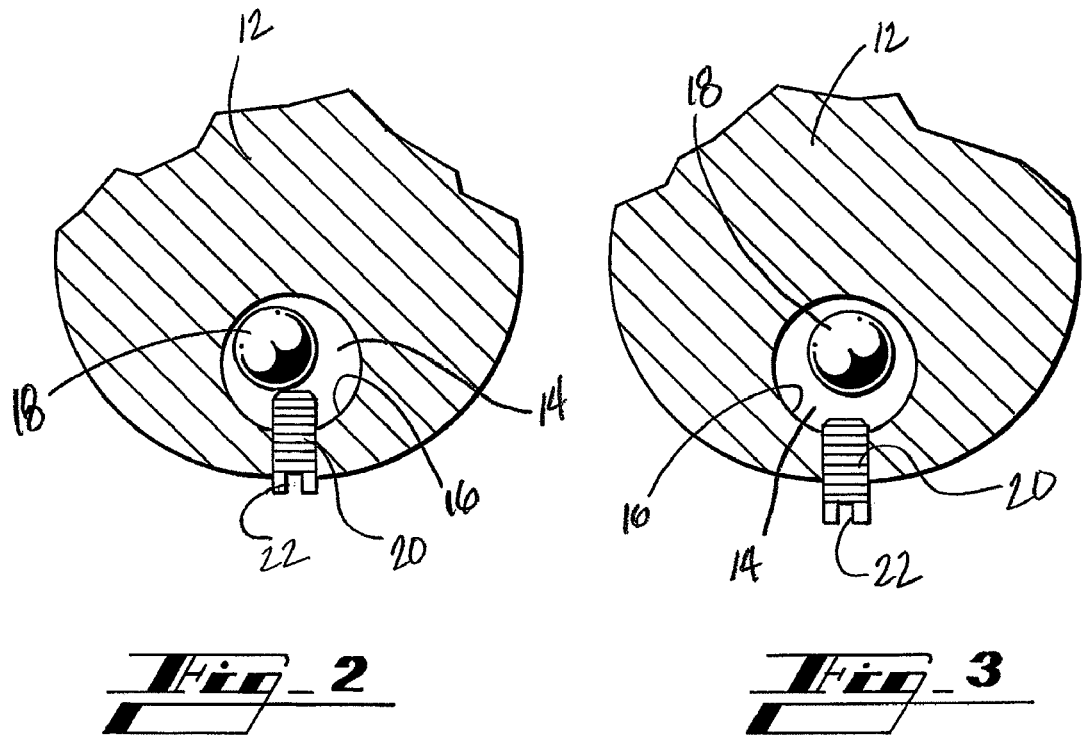
Fig_2
Fig_3

ADJUSTABLE RATTLE FISHING LURE

FIELD OF THE INVENTION

The present invention relates to a fishing lure, and more particularly, to a fishing lure having at least one adjustable rattle to produce a variable noise to attract fish.

BACKGROUND OF THE INVENTION

One of the most important aspects of fishing is to attract fish. Particularly when a hook is employed, the fish must be tempted to seize the hook. One of the oldest ways to attract fish to the hook is to put live bait on the hook, such that the bait's motion will attract fish. In addition to live bait, artificial bait is commonly used. Some types of artificial bait are mounted right on the hook. Innumerable lures have been designed to simulate a swimming fish, frog or other animal that is attractive to fish as a food source.

In addition to the bait on the hook or lines, other methods are used to attract fish into the general vicinity. One successful method of attracting fish is to create particular noises in the water which attract the fish. Battery operated noise makers have been submerged under water and activated to produce a noise to attract fish. Lures have also been designed to rapidly revolve when drawn through the water to create a whistle-like sound. Noise has been well documented in fishing literature as an attractant to fish. In actual practice, however, water can mute sounds emitted from a lure. Attendant fluid and aerodynamic properties of a lure can affect the emitted sound. Capillary action between adjacent lure parts and lure motion can also cause any sound making parts that are exposed to the water to stick together or move slowly. Parts mounted in watertight chambers overcome the foregoing, but the sounds are muted by the sound insulating properties of the surrounding chambers.

BRIEF SUMMARY OF THE INVENTION

The present invention is a fishing lure having a rattling assembly for attracting fish, wherein the sound of the rattling assembly is adjustable as desired by the user according to the desired level to attract, rather than scare, fish to the user's lure. The rattling assembly includes a rattle member and a rod member positioned inside a cavity defined in the body of the fishing lure. The rod member traverses the exterior surface of the fishing lure into the cavity, such that the position of the rod member will determine the ability of the rattling member to travel within the cavity to strike the walls of the cavity.

BRIEF DESCRIPTION OF THE DRAWINGS

A fishing lure having at least one adjustable rattle for variable sound generation embodying the features of the present invention is depicted in the accompanying drawings, which form a portion of this disclosure, wherein:

FIG. 1 is a perspective view of the fishing lure of the present invention;

FIG. 2 is a sectional view of the rattle member within the fishing lure with a rod member engaging the rattle member; and FIG. 3 is a sectional view of the rattle member within the fishing lure as illustrated in FIG. 2 with the rod member not engaging the rattle member.

DETAILED DESCRIPTION OF THE INVENTION

Looking to FIG. 1, a fishing lure 10 of the present invention is illustrated. The fishing lure 10 includes a body 12 having an exterior surface 12a decorated like a fish, including painted eyes, scales, fins, among other attributes, to attract fish. In the embodiment illustrated in FIG. 1, the fishing lure 10 has the body 12 of a crank bait made of hard plastic or wood, although it is noted that the body 12 may take the form of any type of fishing lure. Inside the body 12, a cavity 14 is defined having a internal surface 16. The internal surface 16 of the cavity 14 is positioned substantially proximate said exterior surface 12a of the body 12.

A rattle member 18 is placed within the cavity 14, such that when the fishing lure 10 is pulled through water, the rattle member 18 will strike the internal surface 16 of the cavity 14. As the rattle member 18 collides with the internal surface 16, a sound will be made to attract the attention of nearby fish and entice such fish to attempt to consume the fishing lure 10. The rattle member 18 as shown in FIGS. 1-3 is a ball, and can be formed of any of a number of materials, such as metal or plastic. It is to be noted, however, the rattle member 18 may be any number of objects in addition to those in the shape of a ball.

The fishing lure 10 of the present invention additionally includes a rod member 20 that is used to penetrate the exterior surface 12a of the body 12 and the internal surface 16 of the cavity 14. The rod member 20 traverses the exterior surface 12a of the body 12 into the cavity 14 so as to selectively fill space within the cavity 14 and further engage the rattle member 18 with an adjustable pressure. When the rod member 20 extends into the cavity 14, as shown in FIG. 2, it will limit the movement of the rattle member 18 in the cavity 14, and thereby control the noise generated by the rattle member 18 as the fishing lure 10 is retrieved in the water. More specifically, the rod member 20 may be urged into the cavity 14 to a degree that the rod member 20 engages the rattle member 18 and forces the rattle member 18 into contact with the internal surface 16 of the cavity 14. When the contact member 20 is in such a position, the rattle member 18 will be kept at one location to prevent the rattle member 18 from striking the internal surface 16 as the fishing lure 10 is drawn through water, thereby preventing the fishing lure 10 from making noise.

As a result, the user of the fishing lure 10 is able to control the noise produced by the fishing lure 10 when in use. That is, if the user determines that a rattling noise is not necessary to attract fish, or worse, that the rattling noise repels fish from striking the fishing lure, then the user may simply force the rod member 20 into the cavity 14. However, if the user determines that noise would be beneficial in attracting fish to the fishing lure 10, the user may simply loosen the rod member 20 so that the rattle member 18 has room to bounce within the cavity 14 between portions of the internal surface 16.

The rod member of the fishing lure 10 illustrated in FIGS. 2 and 3 is a screw having a slotted head 22. The slotted head 22 allows the user to easily rotate the rod member screw 20 into and away from the cavity 14. Furthermore, the rod member 20 may also be made of plastic or a similar resin material, which will prevent water from entering the cavity 14 without concern as to rust of on the rod member 20. Furthermore, the rod member 20 will prevent water from entering the cavity 14 whether the rod member 20 is inserted into the cavity 14 to its full extent or withdrawn from the cavity 14.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

The invention claimed is:

1. A method for controlling the noise produced by a rattle member within a fishing lure when the fishing lure is drawn through water, said method comprising the steps of:
   a) inserting a rod member into a rattle member cavity having an interior surface, said rattle member cavity surrounding the rattle member within the fishing lure;
   b) adjusting the position of said rod member in said rattle member cavity to selectively allow movement of the rattle member against the interior surface of said rattle member cavity as the lure is drawn through water;
   c) providing a screw for the rod member;
   d) tightening said rod member to extend into said rattle member cavity and engage said rattle member; and
   e) preventing the movement of the rattle member in said rattle member cavity.

2. The method as described in 1 further comprising the step of:
   loosening said rod member to withdraw from said rattle member cavity; and
   allowing the rattle member to move within said rattle member cavity.

* * * * *